US006945499B1

(12) United States Patent
Robinson

(10) Patent No.: US 6,945,499 B1
(45) Date of Patent: Sep. 20, 2005

(54) SATELLITE STAND-OFF TETHER SYSTEM

(75) Inventor: Ernest Y. Robinson, Altadena, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/804,911

(22) Filed: Mar. 19, 2004

(51) Int. Cl.[7] .................................................. B64G 1/00
(52) U.S. Cl. ...................... 244/158 R; 212/76; 212/83; 104/173.1; 414/142.8
(58) Field of Search ............................ 244/158 R, 172, 244/168, 167; 212/71, 76, 83, 274, 307, 325; 414/141.3, 142.8; 114/230.22; 52/108

(56) References Cited

U.S. PATENT DOCUMENTS 2,799,403 A * 7/1957 Friedman ..................... 212/83
3,333,788 A * 8/1967 Dryden ................... 244/158 R
3,838,657 A * 10/1974 Fleming ................ 114/230.22
4,083,520 A * 4/1978 Rupp et al. ................. 244/167
4,587,777 A * 5/1986 Vasques et al. ............... 52/108
6,494,143 B1 * 12/2002 Bolonkin ................ 104/173.1

OTHER PUBLICATIONS

Nakamura et al, "Double tethered experimental satellite (D-TES)", 1998 University Space Systems Symposium.*

* cited by examiner

*Primary Examiner*—Galen Barefoot
(74) *Attorney, Agent, or Firm*—Derrick Michael Reid

(57) ABSTRACT

A tethered spacecraft is tethered to a base using a semirigid stand-off and a moving tether operated as a belt drive and operated in tension so that the tethered is precisely positioned in tension from the base spacecraft.

10 Claims, 3 Drawing Sheets

TETHERED SPACECRAFT RETRACTED POSITIONING

BASE SPACECRAFT AND TETHERED SPACECRAFT IN A STOWED RETRACTED POSITION

BASE SPACECRAFT AND TETHERED
SPACECRAFT WITH EXTENDED STAND-OFF

TETHERED SPACECRAFT EXTENDED POSITIONING

TETHERED SPACECRAFT RETRACTED POSITIONING

SATELLITE STAND-OFF TETHER SYSTEM

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of spacecraft deployment systems. More particularly, the invention relates to the deployment of spacecraft tethered systems for tethered positioning two spacecraft relative to each other.

BACKGROUND OF THE INVENTION

Tethered space mission systems have long been used to maintain coupling between two space objects. In the early Apollo missions, astronauts were tethered to a mother orbiting spacecraft through the use of an tethering umbilical cord. The astronauts would operate hand held thrusters while floating in free space but with attachment to the spacecraft. The thrusters could allow and astronauts to be imprecisely positioned relative to and from the mother spacecraft. With the advent of the space shuttle, elongated mechanical arms under robotic control could deploy a payload, such as the Hubbell Telescope, at a position from the Shuttle. Such mechanical arms were especially adapted for mated coupling and release to the payload. These mechanical arms need not require precise remote position, nor precise dynamic control of the mechanical arm motion, as the mechanical arm served merely to deploy the payload into a desired orbit with a gross positioning margin from the spacecraft.

More recent space missions have sought to deploy a plurality of spacecraft in precise relative positions from each others. Tethering one spacecraft to another can be used for various applications, such as space interferometry. The so-called ProSEDS mission deployed a pair of tethered masses to explore on-orbit tether dynamics. Means are required to maintain a tension force in the tether in order to avoid tether collapse and uncontrolled oscillations. These means involve whirling to achieve centrifugal force, or gravity gradient stabilization. Plans for a space-based interferometer are considering centrifugally stabilized interferometer nodes separated by a long tether. Such systems are vulnerable to oscillation and collapse of the flexible tether, and to persisting libration motions. The present concept deploys a tether with inherent stiffness, that resists collapse, and therefore will not require whirling or centrifugal force for stability. On-orbit flight mechanics of tethered systems will be simplified by having a rigidized tether, allowing the combination of masses to be repositioned and stabilized, even if temporary overloads may cause tether buckling, since the natural, non-linear state of the tether stiffness is to revert to a stable straight orientation. The non-linear character of the tether, from buckled to straight orientation, also contributes to recovery of a straight stable configuration. Additonally, the present configuration enables the adjustable reposition of a central mass, that could be one element of a space interferometer, along the rigidized tether, while the total tether length remains constant and stable. Such tethered system disadvantageously suffer from slacking instabilities, undesirable mechanical resonant motion during dynamic motion of the tethered component, and uneven centrifugal forces. Such systems are characterized as experiencing partial tether collapse, slacking instabilities, and loss of tension between the two tethered spacecraft that prevents continuous precise tethered positioning. Particularly, these tethered systems experience whirl instabilities of centrifugal forces between two spacecraft rotating about each other producing imprecise tethered positioning. These and other disadvantages are solved or reduced using the invention.

SUMMARY OF THE INVENTION

An object of the invention is to provide to a tethered system between a plurality of spacecraft for precisely positioning the plurality of spacecraft from each other.

Another object of the invention is to provide a tethered system for a base spacecraft and a tethered spacecraft for precise tethered positioning the two spacecraft from each other.

Yet another object of the invention is to provide a tethered system for a base spacecraft and a tethered spacecraft for precise tethered positioning of the two spacecraft from each other using tensioned tethering.

Still another object of the invention is to provide a tethered system for a base spacecraft and a tethered spacecraft for precise tethered positioning of the two spacecraft from each other using tensioned tethering at various tethered distances.

A further object of the invention is to provide a tethered system for a base spacecraft and a tethered spacecraft for precise tethered positioning of the two spacecraft from each other using tensioned tethering at various tethered distances with reduced slacking instabilities.

Yet a further object of the invention is to provide a tethered system for a base spacecraft and a tethered spacecraft tethered together as a lumped mass for precise tethered positioning of the two spacecraft from each other using tensioned tethering at various tethered distances with reduced slacking instabilities.

The invention is directed a spacecraft tethered system for precisely positioning two spacecraft from each other in space. In the preferred form, a tethered spacecraft is tethered to a base spacecraft up to a desirable tethered stand-off distance with the tethered spacecraft between positioned along the stand-off distance in tension using an endless tethered. The base spacecraft has a variable length stand-off that extends from the base spacecraft up to a maximum stand-off distance under reel motor control. Reel dispensing motors are used to extend and retract the stand-off. The stand-off preferably has a pulley coupled at a distal end of the stand-off. Preferably, a flexible endless tethered extends from the base spacecraft, along and in parallel to the stand-off, around the distal end pulley, and along and in parallel again to the stand-off back to the base spacecraft. Opposing top and bottom tethered drive reel motors are used to release and take-up the tether during the time the stand-off is being extended or retracted, respectively. Once the stand-off is disposed to a desired stand-off position, the distance between the base spacecraft and the pulley is the maximum stand-off distance in which the tethered spacecraft can be positioned from the base spacecraft. The tether is flexible for enabling tether release and take-up by the tether drive reel motor.

During stand-off positioning, both of the tether drive reel motors release the tether. After stand-off positioning, one of the tether drive motors releases the tether as the other tether drive real motors take-up the tether so as to drive the tether back and forth along the stand-off as a belt drive tether. The tethered spacecraft is fasten to the tether such that tethered spacecraft can be driven back and forth to any desired position along the stand-off. With the tethered remaining in tension as all times, the tethered spacecraft can be precisely positioned from the base spacecraft up to the maximum stand-off distance, without tether slacking and dynamic instabilities. These and other advantages will become more apparent from the following detailed description of the preferred embodiment.

DETAILED DESCRIPTION OF THE PREFERRED EMBODIMENT

Figure 1:
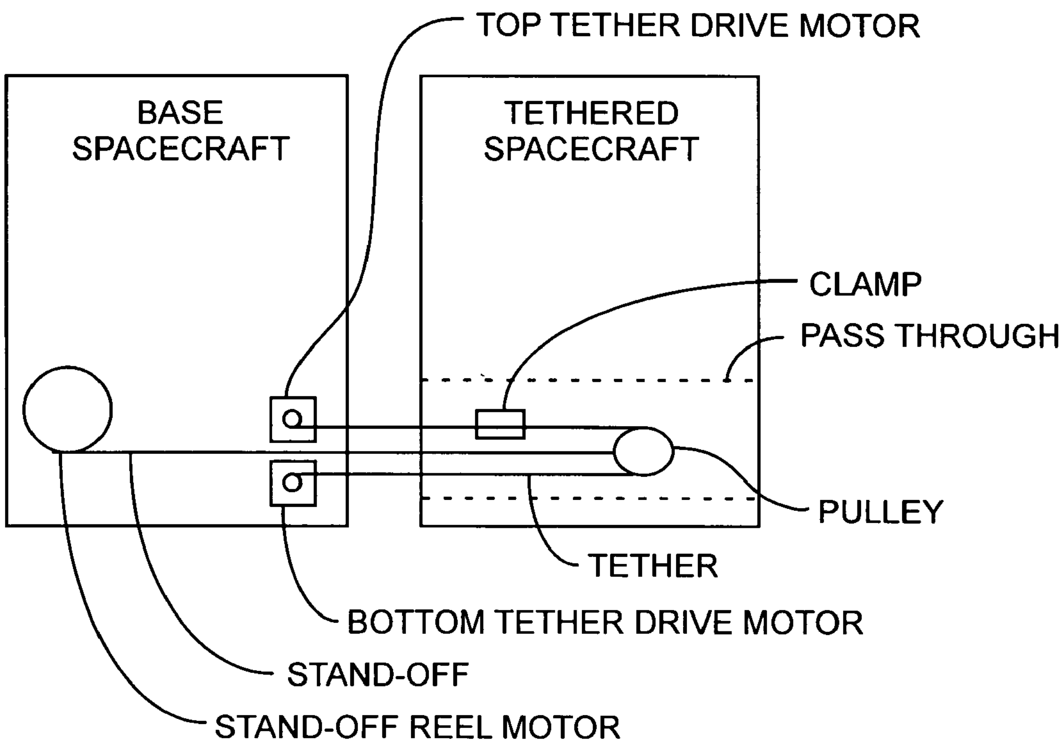
FIG. 1 depicts a base spacecraft and a tethered spacecraft is a stowed position.

An embodiment of the invention is described with reference to the figures using reference designations as shown in the figures. Referring to FIG. 1, a based spacecraft and a tether spacecraft are initially juxtaposed in a towed position. The base spacecraft includes a stand-off reel drive motor for extending and retracting a flexible semi-rigid stand-off. A top tether drive motor and a bottom tether drive motor are used to release and take-up a tether extending between the top and bottom drive motor and along the standoff, around a pulley couple to the distal end of the stand-off, and back again along the stand-off. A clamp is used to fasten the tethered spacecraft to the tether. The claim is preferably a nut and screw fastener for coupling to the tether and is preferably bolted to the tethered spacecraft. In a stowed position, the stand-off is fully retracted so as to position the pulley to an interior position within the two spacecraft, and in the preferred form, to position the pulley within the based spacecraft. So positioned, the two spacecraft are in a compact juxtaposed position.

Figure 2:
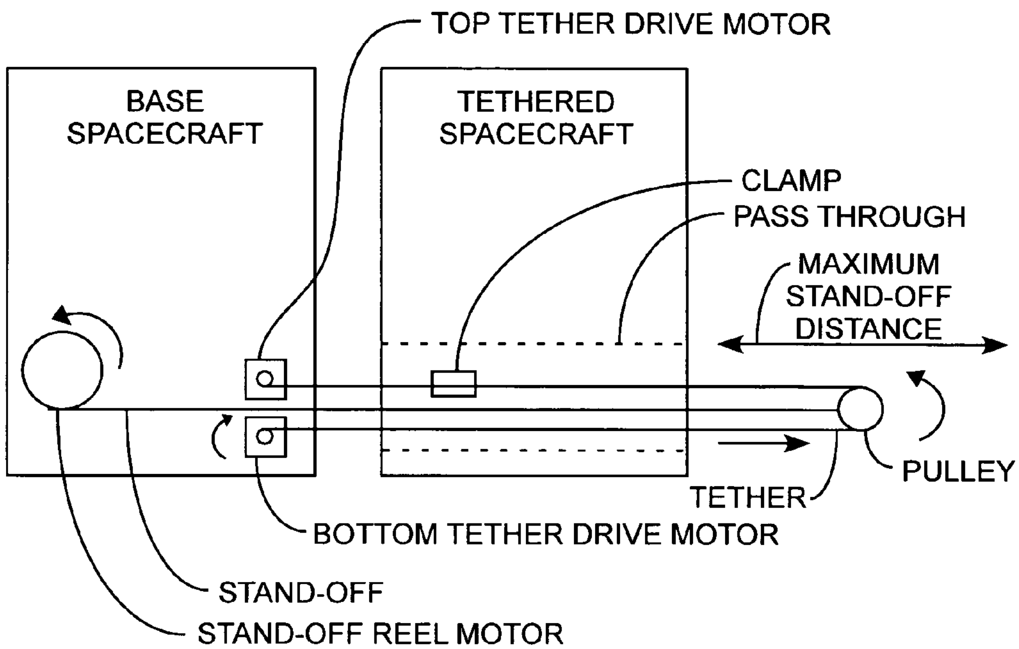
FIG. 2 depicts an extension of a stand-off from the spacecraft.

Referring to FIGS. 1 and 2, and more particularly to FIG. 2, the stand-off reel motor is driven so as to extend the stand-off up to a maximum stand-off distance. In an exemplar form, the top tether drive motor remains inoperative so as to maintain the base spacecraft and the base spacecraft is the juxtaposed position with the tethered spacecraft clamped a nonmoving section of the tether in a top section of the tether of that is not moving, while the stand-off is being extending with bottom tether drive motor releasing the tether so as to move a moving section of the tether for enable the stand-off extension. As the stand-off is being extended, the distal pulley is being extended away from the base spacecraft up to the maximum stand-off distance. It should now be apparent that the stand-off can now be retracted from this maximum extended stand-off position by driving the stand-off reel motor in the opposite rotating direction so as to take-up the stand-off while concurrently also driving the bottom tether drive motor in the opposite rotating direction so as to take-up the bottom moving portion of the tether so as to pull the pulley towards the base spacecraft thereby retracting the stand-off to the stowed position.

Figure 3A:
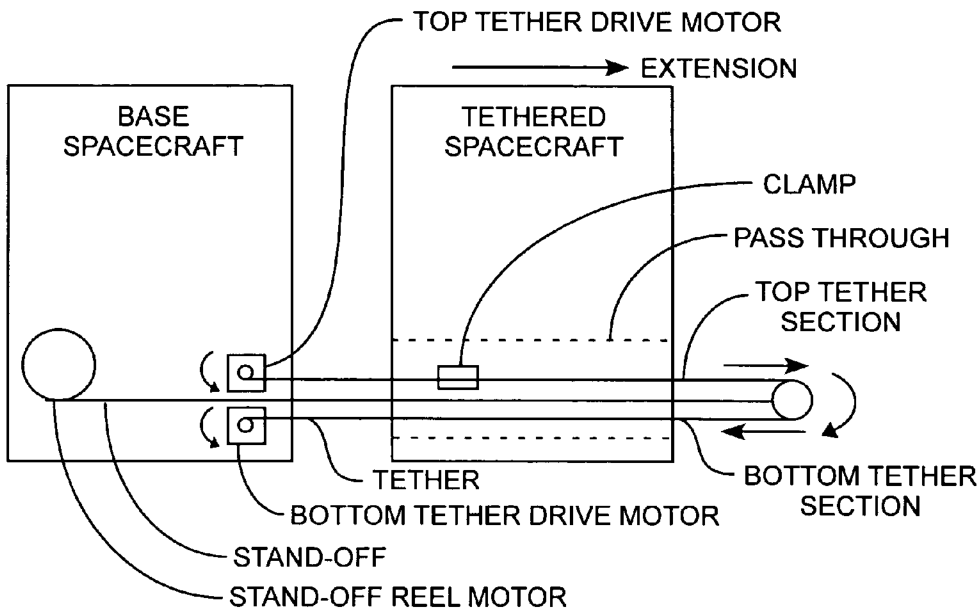
FIG. 3A is depicts the tethered spacecraft clamped to a movable tethered for extended positioning the tethered spacecraft from the base spacecraft.
Figure 3B:
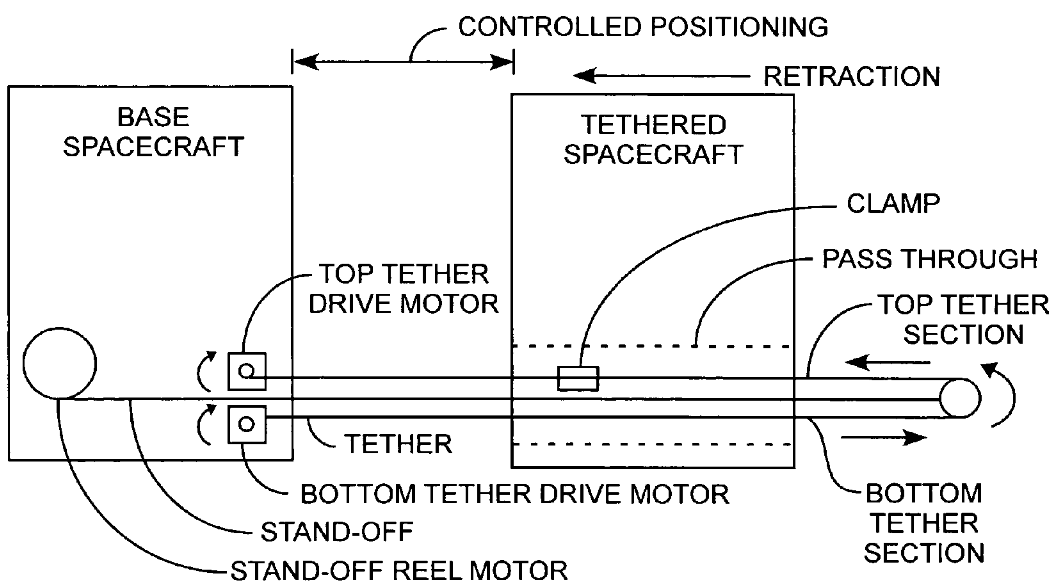
FIG. 3B is depicts the tethered spacecraft clamped to a movable tethered for retracted positioning the tethered spacecraft from the base spacecraft.

Referring to all of the Figures, and more particularly to FIGS. 3A and 3B, the tethered spacecraft can be position to an desired positioned between the base spacecraft and the pulley preferably predisposed at the maximum stand-off distance. To position the tethered spacecraft to any position along the extended length of the standoff, the top and bottom tether drive motors are concurrently driven in opposing direction so that one drive motor takes up the tether while the other releases the tether. In both operation the tether and tether drive motor functions as belt drive about the pulley. To extend the tethered spacecraft from the base spacecraft as shown in FIG. 3A, the top tether drive motor is operated to release the tether so that the top tether section moves towards the pulley as does the tether spacecraft, while the bottom tether drive motor is concurrently operated to take-up the tether so that the bottom tether section moves away from the pulley, so that, at all times, the tether remains in tension. To retract the tethered spacecraft towards the base spacecraft as shown in FIG. 3B, the top tether drive motor is operated to take-up the tether so that the top tether section moves away from the pulley as does the tether spacecraft, while the bottom tether drive motor is concurrently operated to release the tether so that bottom tether section moves toward the pulley, so that, at all times, the tether remains in tension. Hence, the equal but opposite drive operations of the top and bottom tether drive motors serves to position the tether spacecraft from the base spacecraft to any desired controlled position, up to the maximum stand-off distance.

In to should apparent that various motors, such as stepper and linear drive motors, can be used as the reel motor or tether drive motors. Motor and motor control functions are well known by those skilled in the mechanical arts. The tether is operated as a belt drive and flexible metal tape belts are preferably used. The stand-off can also be a flexible metal tape, as in a common tape measure, having a concave shape extending the length of the stand-off tape, so that the stand-off can be released and taken up, while also being rigid when extended. Other configuration of the invention, may be desirable, such as placing the bottom tether drive motor at the distal end of the stand-off, in replacement of the distal pulley, so that tethered is equally but oppositely taken up and release at opposing ends of the stand-off for back and forth positioning of along the length of the tethered and stand-off where the tether and stand-off are coextensive in length. As may be apparent, another component, not shown, can be attached to the tether for positioning the component between the base spacecraft and the tethered spacecraft.

The present invention is generally characterized by an extended stand-off for providing a maximum stand-off distance, and a movable tether extending between the maximum stand-off distance and a base spacecraft, with a tethered spacecraft fastened to the tether for positioning the tethered spacecraft to a desired controlled position between the base spacecraft and the maximum stand-off distance. In the preferred form, the tether is belt driven by opposing drive motors so that the tether functions as a belt drive. The spacecraft can be satellites, such as picosatellites performing various missions, such as space interferometry. Those skilled in the art can make enhancements, improvements, and modifications to the invention, and these enhancements, improvements, and modifications may nonetheless fall within the spirit and scope of the following claims.

What is claimed is:

1. A system for positioning a tethered spacecraft from a base spacecraft, the system comprising, a stand-off extending from the base spacecraft for providing a maximum stand-off distance, a tether extending the length of the stand-off, a tether drive motor for moving the tether the length of the stand-off, and a fastener for coupling the tethered spacecraft to the tether, the tether drive motor operated to move the tethered spacecraft to a desired distance from the base spacecraft up to the maximum stand-off distance.

2. The system of claim 1 wherein, the tether drive motor comprises opposing tether drive motors, and the stand-off comprises a pulley, the tether extending along the length of the stand-off and around the pulley and again along the length of the stand-off, the opposing tether motors respectively releasing and taking up the tether for extending and retracting the tether spacecraft away from and toward the base spacecraft respectively.

3. The system of claim 1 wherein, the fastener is a clamp.

4. The system of claim 1 wherein, the tether is a metal belt operated as a belt drive.

5. The system of claim 1 wherein the stand-off is a semirigid metallic tape, the system further comprising, a stand-off reel motor for releasing and taking up the semirigid metallic tape.

6. The system of claim 1 wherein the stand-off is a semirigid metallic tape having a concave surface, the system further comprising, a stand-off reel motor for releasing and taking up the semirigid metallic tape.

7. A system for positioning a tethered spacecraft from a base spacecraft, the system comprising, a stand-off extending from the base spacecraft for providing a maximum stand-off distance, a stand-off reel motor coupled to the base spacecraft for taking up and releasing the stand-off to the maximum stand-off distance, a pulley disposed at a distal end of the stand-off at the maximum stand-off distance, the tether extending along the length of the stand-off and around the pulley and again along the length of the stand-off, opposing tether drive motors for taking up and releasing the tether extending between the opposing tether drive motors, and a clamp for coupling the tethered spacecraft to the tether, the opposing tether drive motor operated to move the tethered spacecraft to a desired distance from the base spacecraft up to the maximum stand-off distance.

8. The system of claim 1 wherein, the tether is a metal belt operated as a belt drive.

9. The system of claim 1 wherein the stand-off is a semirigid metallic tape, the system further comprising, a stand-off reel motor for releasing and taking up the semirigid metallic tape.

10. The system of claim 1 wherein the stand-off is a semirigid metallic tape having a concave surface, the system further comprising, a stand-off reel motor for releasing and taking up the semirigid metallic tape.

* * * * *